US009871870B1

(12) United States Patent
Hsieh et al.

(10) Patent No.: US 9,871,870 B1
(45) Date of Patent: Jan. 16, 2018

(54) PSEUDONYMOUS COMMUNICATION SESSION GENERATION AND MANAGEMENT SYSTEMS AND METHODS

(71) Applicant: Flowroute Inc., Seattle, WA (US)

(72) Inventors: Sean Hsieh, Seattle, WA (US); Daniel Nordale, Seattle, WA (US); Dan Root, Seattle, WA (US); Bayan Towfiq, Seattle, WA (US); MohammedAli Merchant, Seattle, WA (US); William King, Seattle, WA (US); Casey MacPhee, Seattle, WA (US)

(73) Assignee: FLOWROUTE INC., Seattle, WA (US)

(*) Notice: Subject to any disclaimer, the term of this patent is extended or adjusted under 35 U.S.C. 154(b) by 0 days.

(21) Appl. No.: 15/432,761

(22) Filed: Feb. 14, 2017

(51) Int. Cl.
*G06F 15/16* (2006.01)
*H04L 29/08* (2006.01)
*H04L 29/06* (2006.01)
*H04L 29/12* (2006.01)

(52) U.S. Cl.
CPC ........ *H04L 67/146* (2013.01); *H04L 61/1535* (2013.01); *H04L 65/1069* (2013.01)

(58) Field of Classification Search
CPC  H04L 67/146; H04L 61/1535; H04L 65/1069
See application file for complete search history.

(56) References Cited

U.S. PATENT DOCUMENTS

| 6,275,494 B1* | 8/2001 | Endo ..................... H04L 49/251 370/395.52 |
| 6,339,594 B1* | 1/2002 | Civanlar ............. H04L 12/2854 370/352 |
| 6,580,704 B1* | 6/2003 | Wellig .............. H04L 29/12009 370/338 |
| 2010/0278099 A1* | 11/2010 | Lee ................... H04L 29/06027 370/328 |
| 2017/0138749 A1* | 5/2017 | Pan ..................... G01C 21/3438 |

* cited by examiner

*Primary Examiner* — John B Walsh
(74) *Attorney, Agent, or Firm* — Aeon Law PLLC; Adam L. K. Philipp; Jonathan E. Olson

(57) ABSTRACT

Certain aspects of the present methods and systems may focus on computer implemented methods and systems for managing pseudonymous communication sessions. Such a system may include a data store, including data records corresponding to a plurality of available data communication addresses ("DCAs"), and including a first DCA; a CPU; and memory. The memory may include instructions for causing the CPU to execute a method including: obtaining a pseudonymous communication session ("PCS") initiation request including a second DCA; removing the first data communication address from said plurality of available data communication addresses and associating the first DCA the second DCA in the data store; providing the first DCA in response to said pseudonymous communication session initiation request; and, in the event of obtaining a data communication from a source DCA directed to the first DCA, creating a PCS between the source DCA and the second DCA.

20 Claims, 13 Drawing Sheets

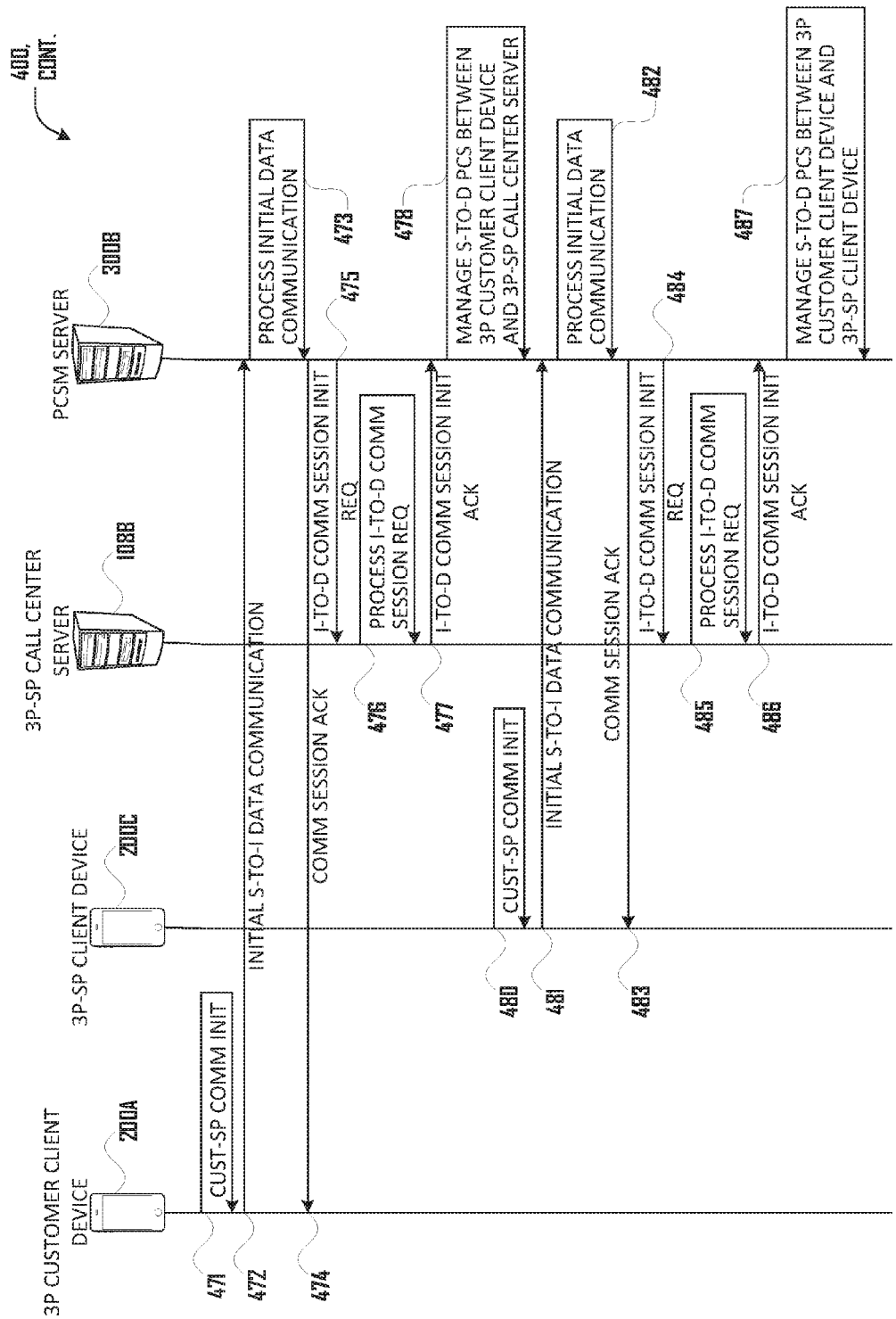

PSEUDONYMOUS COMMUNICATION SESSION GENERATION AND MANAGEMENT SYSTEMS AND METHODS

FIELD

The present disclosure relates to communication session management and more particularly to systems and methods for pseudonymous communication session generation and management.

BACKGROUND

An operator of a service, such as a ride-sourcing service, may wish to enable communication between the service's customers and the service's service providers. For example, an operator of a customer client device may use a client application to provide a service provider server with a request for service. The request for service may include a customer identifier, a starting location, a desired destination, and other relevant details. The service provider server may use the information provided in the request for service to invite an operator of a service provider client device to fulfill the request. The operator of the service provider client device may indicate acceptance of the service invitation. The service provider server may then instantiate a ride-sourcing session associated with the customer client device and the service provider client device.

The third-party ride sourcing service may now wish to facilitate direct communication between the operator of the customer client device and the operator of the service provider client device. The service provider server could provide the customer client device and the service provider client device with data communication addresses associated with the service provider client device and the customer client device, respectively.

BRIEF DESCRIPTION OF THE DRAWINGS

FIGS. 4A-C illustrate a first exemplary series of communications between various devices shown in FIG. 1, including a PCSM server in accordance with various embodiments.

DESCRIPTION

Figure 1:
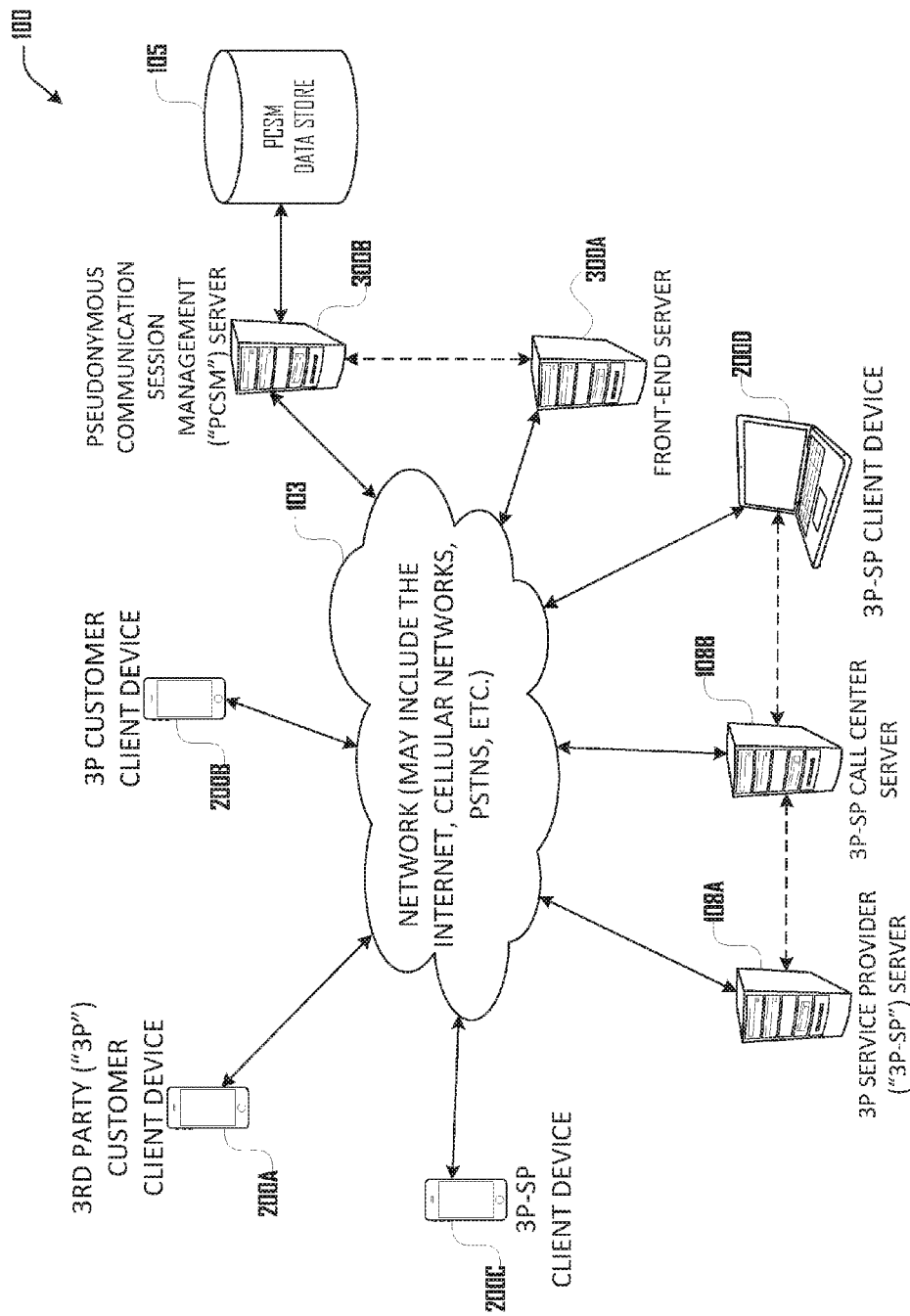
FIG. 1 illustrates an exemplary network topology including a pseudonymous communication session management ("PCSM") system in accordance with various embodiments.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network, which may include, but is not limited to, the Internet.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Exemplary Network Topology of a Pseudonymous Communication Session Management System FIG. 1 illustrates components of a network topology 100 including a pseudonymous communication session management ("PCSM") system. The illustrated embodiment is primarily implemented by a PCSM server 300B. For the purposes of the present examples, PCSM server 300B, a third-party service provider ("3P-SP") server 108A, an 3P-SP call center server 108B, a PCSM front-end server 300A, third-party ("3P") customer client devices 200A-B, and 3P-SP client devices 200C-D are illustrated as being in data communication with a network 103.

For the purposes of the present examples, 3P-SP server 108A may be operated in furtherance of a third-party commercial enterprise, such as a ride sourcing service, an airline, a property management company, a delivery service, a retailer, and/or the like. 3P customer client devices 200A-B may be operated by customers of the third-party commercial enterprise. 3P-SP client devices 200C-D may be operated by individual service providers in furtherance of the third-party commercial enterprise. For example, 3P-SP 200C may be operated by a transportation provider and 3P-SP 200D may be operated by a call-center customer service representative in furtherance of a third-party ride sourcing service.

In some embodiments, various devices, such as PCM server 300B and PCSM front-end server 300A, may optionally be in direct data communication (indicated by dotted line), e.g. via a local network connection. In various embodiments, network 103 may include the Internet, one or more local area networks ("LANs"), one or more wide area networks ("WANs"), public-switched telephone networks ("PSTNs"), cellular data networks, and/or other data networks. Network 103 may, at various points, be a wired and/or wireless network. PCSM server 300B may be in data communication with a pseudonymous communication session ("PCS") data store 108. In some embodiments, remote In these and other embodiments, various client devices 200, such as 3P customer client devices 200A-B and 3P-SP client devices 200C-D, may be networked computing devices having form factors including general purpose computers (including "desktop," "laptop," "notebook," "tablet" computers, or the like); mobile phones; watches, glasses, or other wearable computing devices; or the like. For simplified exemplary purposes, two third-party customer client devices and two third-party service provider client devices are shown. In various embodiments there may be many more client devices 200. The primary functional components of an exemplary, form-factor-independent client device 200 are described below in reference to FIG. 2.

In various embodiments, PCSM front-end server 300A and PCSM server 300B may be networked computing devices generally capable of accepting requests over network 103, e.g. from client devices 200A-D, each other, various databases, and/or other networked computing devices, such as other third-party service provider servers, such as 3P-SP server 108A and 3P-SP call-center server 108B, and providing responses accordingly. The primary functional components of an exemplary server 300, such as remote PCSM front-end server 300A and remote PCSM server 300B, are described below in reference to FIG. 3.

Exemplary Client Devices

Figure 2:
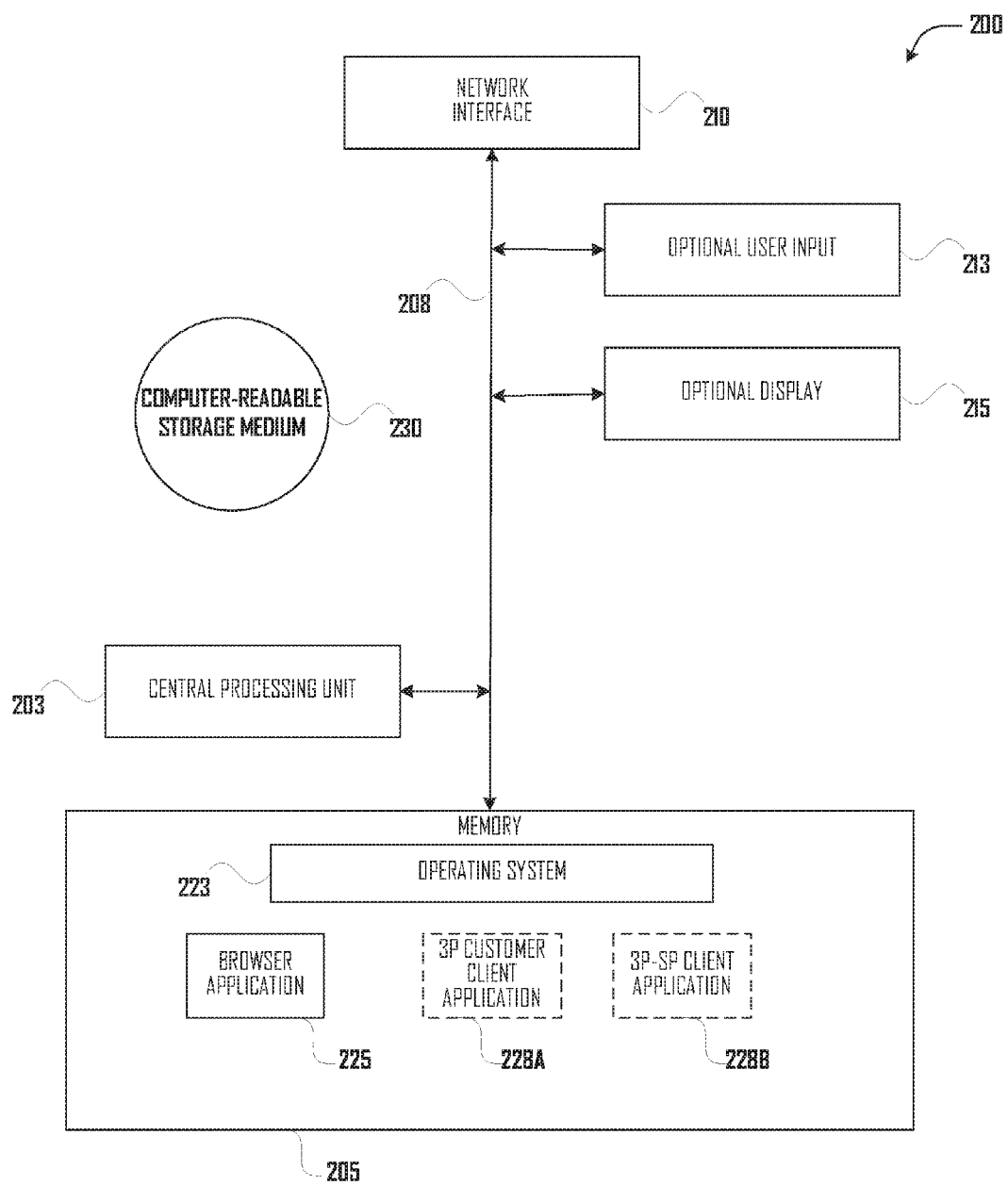
FIG. 2 illustrates a functional block diagram of an exemplary client computing device, suitable for interacting with PCSM systems in accordance with various embodiments.

FIG. 2 illustrates several components of an exemplary client device 200, such as any of 3P customer client devices 200A-B and third-party service provider ("3P-SP") client devices 200C-D, is illustrated. However, the present methods and systems do not depend on any particular internal configuration or functionality of a client device 200, so long as the client device is capable of data communication with the PCSM system.

As shown in FIG. 2, exemplary client device 200 includes a computer processing unit comprising central processing unit 203 in data communication with memory 205 via a bus 208. Central processing unit 203 is an electronic circuit designed to carry out instructions of a computer program, e.g. obtained from memory 205, by performing the arithmetic, logical, control and input/output (I/O) operations specified by the program's instructions. Memory 205 generally comprises some or all of random access memory (RAM), read-only memory (ROM), and/or a permanent mass storage device, such as a disk drive, flash memory, or the like. Bus 208 is a communication system that transfers data between components within client device 200, and encompasses any related hardware components (wire, optical fiber, etc.) and software, including communication protocols; the data communications between various components of client device 200 may be accomplished by wired and/or wireless connections.

Client device 200 may also include a network interface 210 for connecting to a network such as network 103; one or more optional user input device(s) 213, e.g. an alphanumeric keyboard, keypad, a mouse or other pointing device, a touchscreen, and/or a microphone (or a user input port for connecting an external user input device); optional display 215 (or a display input port for connecting to an external display device); and the like, all interconnected, along with the network interface 210, to central processing unit 203 and memory 205 via bus 208. In some embodiments, a client device 200 may include many more components than those shown in FIG. 2. For example, one or more of 3P customer client devices 200A-B and 3P-SP client devices 200C-D may include a global positioning module (not shown). However, it is not necessary that these, generally conventional, components be shown in order to disclose an illustrative embodiment.

Memory 205 of exemplary client device 200 may store program code, executable by central processing unit 203, corresponding to an operating system 223, as well as program code corresponding to various software applications, such as a browser application 225, a 3P customer client application 228A (in the case of 3P customer client devices 200A-B), 3P-SP client application 228B (in the case of 3P-SP client devices 200A-C), and other software applications (not shown). Operating system 223 and such various software applications may be loaded into memory 205 via network interface 210 or via a computer readable storage medium 230, such as a hard-disk drive, a solid-state drive, an optical disc, a removable memory card, and/or the like.

In operation, operating system 223 manages the hardware and software resources of client device 200 and provides common services and memory allocation for various software applications, such as research study data acquisition and quality control application 228. For hardware functions such as network communications via network interface 210, receiving data via input 213, outputting data via optional display 215, and allocation of memory 205 for various software applications, such as browser application 225, operating system 223 acts as an intermediary between software executing on the client device and the device's hardware.

For example, operating system 223 may cause a representation of available software applications, such as browser application 225 and 3P customer client application 228A or 3P-SP client application 228B, to be presented to a user of client device 200 via display 215. If client device 200 obtains an indication from a user, e.g. via user input 213, a desire to use a specific software application, operating system 223 may instantiate a corresponding application process (not shown), i.e. cause central processing unit 203 to begin executing the executable instructions of the application and allocate a portion of memory 205 for its use.

Browser application 225 may be a software application for retrieving, processing, presenting, and traversing information resources on a network, such as network 108. Although browser application 225 may be primarily intended to use the World Wide Web, it may also be used to access information resources provided by remote servers in private networks. An information resource may be a web page, an image, a video, or other piece of content and may be identified by a Uniform Resource Identifier (URI/URL) on network 108. An information resource may also provide browser application 225 executable program code for web applications, i.e. a software application that runs in and is rendered by browser application 225.

Third-party customer client application 228A and third-party service provider ("3P-SP") client application 228B may each be software applications for retrieving, processing, presenting, and traversing information resources from a software service (not shown) operating on a server such as 3P service provider server 108A. For example, 3P service provider server 108A may provide a ride-sourcing service that coordinates the interaction between customers in need of transportation services, e.g. the operators of 3P customer client devices 200A-B, and transportation service providers, e.g. the operators of 3P-SP client devices 200C-D. In some cases, a customer of the ride sourcing service, such as the operator of 3P customer client devices 200A may use 3P customer client application 228A to communicate a need for transportation services to 3P service provider server 108A. 3P service provider server 108A server may search for a transportation service provider, such as the operator of 3P-SP client device 200C, that is in the geographic vicinity of the customer. 3P service provider server 108A may then provide a request to 3P-SP client device 200C relating to the customer's location via 3P-SP client application 228B.

In the case of a web application, browser application 225 may act as an intermediary between a software service operating on a remote server and the operating system 223. For example, a software service equivalent of either 3P customer client application 228A and/or 3P-SP client application 228B may be executing on PCSM front-end server 300A.

Although an exemplary client device 200 has been described with hardware components that generally conforms to conventional general purpose computing devices, a client device may be any of a great number of devices capable of communicating with network 103 and executing instructions for performing either 3P customer client application 228A and/or 3P-SP client application 228B.

Exemplary Servers

Figure 3:
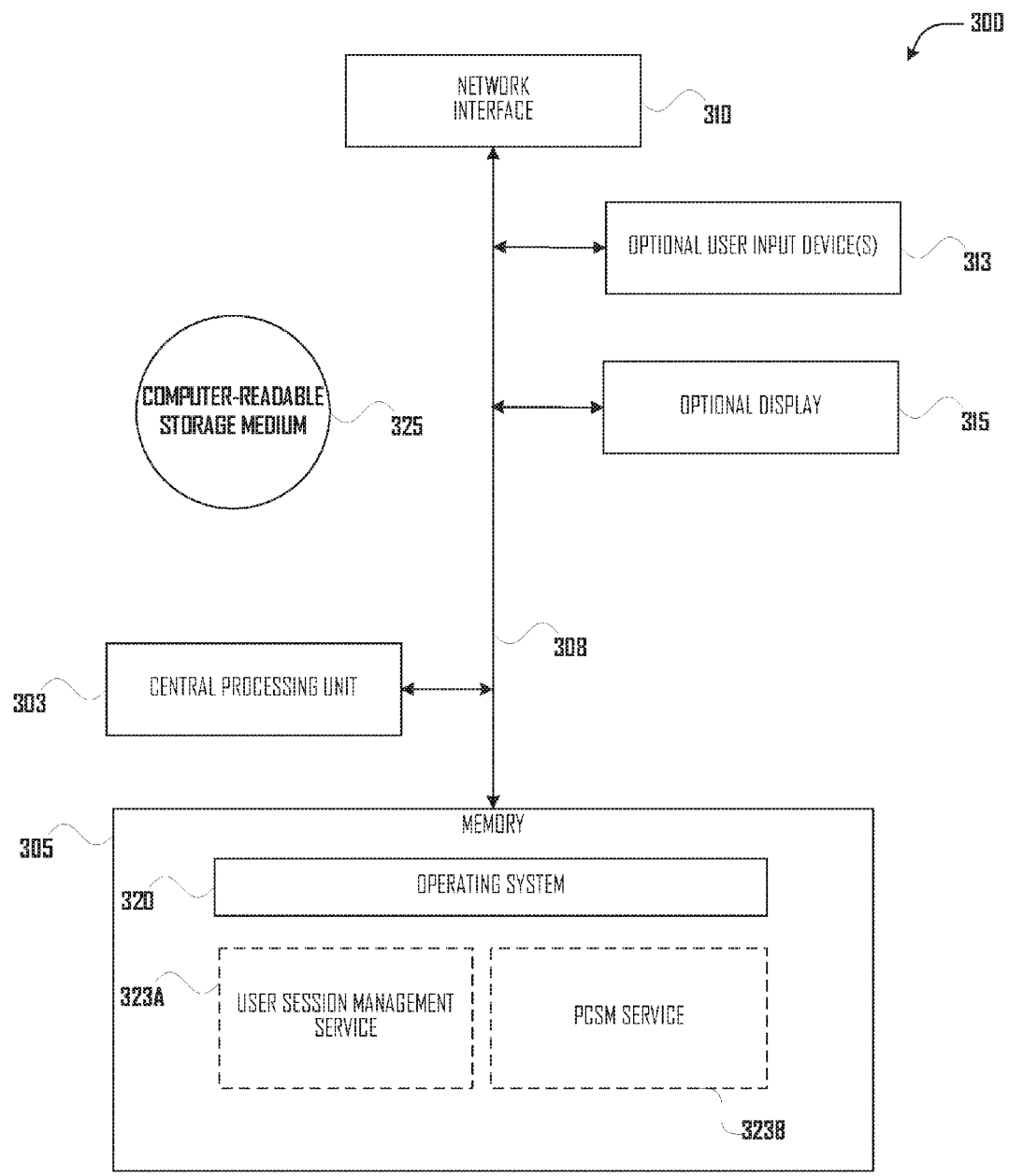
FIG. 3 illustrates a functional block diagram of an exemplary server computing device, suitable for implementing various aspects of a PCSM system in accordance with various embodiments.

FIG. 3 illustrates several components of an exemplary server 300, such as PCSM front-end server 300A and PCSM server 300B, in accordance with at least one exemplary embodiment are illustrated. As shown in FIG. 3, a server 300 includes a central processing unit 303 and memory 305 connected by a bus 308.

Central processing unit 303 is an electronic circuit designed to carry out instructions of a computer program, e.g. obtained from memory 305, by performing the basic arithmetic, logical, control and input/output (I/O) operations specified by the program's instructions. Memory 305 may generally include some or all of random access memory (RAM), read-only memory (ROM), and/or a permanent mass storage device, such as a disk drive, flash memory, or the like. Bus 308 is a communication system that transfers data between components within exemplary server 300, and includes any related hardware components (wire, optical fiber, etc.) and software, including communication protocols.

Server 300 may also include a network interface 310 for connecting to a network such as network 103, one or more optional user input device(s) 313, e.g. an alphanumeric keyboard, keypad, a mouse or other pointing device, a touchscreen, and/or a microphone, (or a user input port for connecting an external user input device) and/or an optional display 315 (or a display port for connecting an external display device), both interconnected along with the network interface 310 via bus 308. In some embodiments, server 300 may include many more components than those shown in FIG. 3. However, it is not necessary that all of these generally conventional components be shown in order to disclose an illustrative embodiment.

Memory 305 may store an operating system 320 and program code for various software services 323. For example, PCSM front-end server 300A may include executable instructions for performing a user session management service 323A (indicated by dotted lines) and PCSM server 300B may include executable instructions for performing a PCSM service 323B (indicated by dotted lines).

Program code for these and other such software services, such as a software services (not shown) equivalent to equivalent to either 3P customer client application 228A and/or 3P-SP client application 228B may be executing on PCSM front-end server 300A, may be loaded into memory 305 from a non-transient computer readable storage medium 325 using a drive mechanism (not shown) associated with the non-transient computer readable storage medium, such as, but not limited to, a DVD/CD-ROM drive, memory card, or the like. Software components may also be loaded into memory 305 via the network interface 310. Server 300 may also communicate via bus 308 with a database (not shown), such as PCSM data store 105, or other local or remote data store.

In operation, operating system 320 manages the hardware and software resources of server 300 and provides common services and memory allocation for various software services, such as user session management service 323A or PCSM service 323B. For hardware functions, such as network communications via network interface 310 and allocation of memory 305 for various software services, such as PCSM service 323B, operating system 320 may act as an intermediary between software executing on server 300 and the server's hardware.

Although an exemplary server 300 has been described having hardware components that generally conform to a conventional general purpose computing device, a server may be any of a great number of devices capable of communicating with network 103 and executing instructions for performing user session management service 323A and/or PCSM service 323B.

In some embodiments, a server 300 may comprise one or more replicated and/or distributed physical or logical devices. In some embodiments, one or more of PCSM front-end server 300A PCSM server 300B may be embodied by the same physical device.

The components of third-party service provider server 108A and third-party call center server 108B may be similar to the components of exemplary server 300. However, the present methods and systems do not depend on any particular internal configuration or functionality of any third-party server, so long as the server is capable of data communication with the PCSM system.

Exemplary Implementations of PCSM Systems

Referring again to FIG. 1, an operator of a service may advantageously utilize a PCSM system, such as client/server-based PCSM system 100, to enable pseudonymous communication between the service's customers, e.g. via client devices such as 3P customer client devices 200A-B, and the service's service providers, e.g. via client devices such as 3P-service provider client devices 200C-D.

In accordance with a first embodiment, a PCSM system may enable pseudonymous communication sessions by dynamically pairing pseudonymous data communication addresses (PDCAs), such as telephone numbers, email domains, or the like, to known data communication addresses (KDCAs), e.g. upon request from a third-party service provider server, such as 3P-SP server 108A. For example, 3P-SP server 108A may provide a pseudonymous communication session (PCS) request to PCSM server 300B. In at least one embodiment, a PCS request may include one or more KDCAs, such as telephone numbers, email domains/addresses, and the like. For example, a third-party commercial enterprise may provide a PCS request including a first KDCA associated with a third-party commercial enterprise customer, such a KDCA associated with 3P customer client device 200A, (the "customer KDCA") and a KDCA associated with a third-party immediate service provider, such as 3P-SP client device 200C (the "service provider KDCA").

In some embodiments, a PCS request may also optionally include a secondary KDCA, e.g. associated with the third-party commercial enterprise's central service provider, such as a KDCA associated with 3P-SP call center server 108B; a preferred type of PCA (e.g. telephone number, email domain, etc.); a first temporal period (referred to herein as the "primary service period"), e.g. forty-eight hours, seven days, or the like; and; a second temporal period (referred to herein as the "secondary service period"), e.g. twenty-eight days, six months, or the like. Alternatively, a PCS request may include a PCSM customer identifier associated with the requesting party, e.g. the third party commercial enterprise, and some or all of the above information, such as the secondary KDCA, the first temporal period, and/or the second temporal period, may be stored in PCSM data store 105 associated with the PCSM customer identifier.

PCSM system 100 may pair a KDCA obtained in a PCS request with a PDCA selected from a pool of available PDCAs associated with the PCSM system 100 and optionally also associated with a PCSM customer identifier. PCSM system may then provide the paired PDCA's in response to the PCS request. For example, PCSM server 300B may then provide a PCS-request response to 3P-SP sever 108A. The PCS-request response may include the paired PDCA(s) and, if necessary, an indication of their respective assignment relative to the KDCA(s) provided in the PCS request.

PCSM system 100 may then begin tracking a primary service period for the KDCA-PDCA pairing(s) provided in the PCS-request response. During a KDCA-PDCA pairing's primary service period, data communication, such as a voice telephone call (analog or digital), SMS text message, and/or the like, directed to the PDCA may be routed to PCSM system 100. PCSM system 100 may then initiate data communication with the KDCA paired to the PDCA. PCSM system 100 may then act as an intermediary for a pseudonymous communication session between the source of the data communication and whatever data communication device is associated with the paired KDCA, such as 3P customer client device 200A or 3P-SP client device 200C.

After a KDCA-PDCA pair's primary service period expires, the PDCA may be re-paired with a secondary KDCA and a secondary service period may begin. During a secondary service period, data communication directed to a PDCA may be routed to the secondary KDCA.

In the case of a third-party ride sourcing service for example, an operator of a 3P customer client device, such as 3P customer client device 200A, may use 3P client application 228A to provide 3P-SP server 108A with a request for service. The request for service may include a customer identifier, a starting location, a desired destination, and other relevant details. 3P-SP server 108A may use the information provided in the request for service to invite a service provider, such as the operator of 3P-SP client device 200C, to fulfill the request, e.g. via 3P-SP client application 228B. The operator of 3P-SP client device 200C may indicate acceptance of the service invitation. 3P-SP server 108A may then instantiate a ride-sourcing session associated with 3P customer client device 200A and 3P-SP client device 200C.

The third-party ride sourcing service may now wish to facilitate direct communication between the operator 3P customer client device 200A and the operator of 3P-SP client device 200C without providing either party with the other's known data communication address, e.g. for privacy reasons. 3P-SP server 108 may therefore provide a PCS request to PCSM front-end server 300A, specifying two KDCA's: a telephone number associated 3P customer client device 200A (the "customer KDCA") and a telephone number associated with the associated with 3P-SP client device 200C (the "service provider KDCA"). The PCS request may also include a secondary KDCA, such as a telephone number associated with 3P-SP call center server 108B, a primary service period, such as twenty-four hours, and a secondary service period, such as fourteen days.

PCSM server 300B may responsively instantiate a PCS data structure associated with the PCS request and including the data provided therein, pair the customer KDCA and service provider KDCA with respective available PDCAs ("first" and "second" PDCAs, respectively), and provide a PCS-request response to 3P-SP sever 108A including the first and second PDCAs and indicating their pairing assignment relative to the customer and service provider KDCAs.

3P-SP server 108A may then provide a data communication to 3P customer client device 200A including, for example, a description of the service provider assigned to the customer's request (such as a name, photograph, vehicle description, etc.), current location, estimated arrival time, and the second PDCA, which is paired to the service provider KDCA. 3P-SP server 108A may also provide a data communication to 3P-SP client device 200C including, for example, a description of the customer making the request (such as a name, photograph, etc.), a pick-up location, a desired destination, and the first PDCA, which is paired to the customer KDCA.

If the operator of 3P customer client device 200A wishes to contact the service provider, e.g. before the service provider has reached the pick-up location because the customer wishes to confirm the service provider's passenger capacity, the customer may provide a data communication to the second PDCA, which is paired to the service provider KDCA in PCSM system 100. This data communication may be routed over network 103 to PCSM server 300B, which may establish a communication session between 3P customer client device 200A and the PCSM server. PCSM server 300B may then look up the second PDCA to find the KDCA paired to it, i.e. the service provider KDCA, and attempt to establish a communication session with 3P-SP client device 200C. If a communication session between PCSM server 300B and 3P-SP client device 200C is established, the PCSM server may then act as an intermediary for pseudonymous communications between 3P customer client device 200A and the 3P-SP client device 200C.

Similarly, if the operator of 3P-SP client device 200C wished to contact the customer, e.g. after the service has ended because the customer has left an item behind, the service provider may provide a data communication to the first PDCA, which is paired to the customer KDCA in PCSM system 100. This data communication may be routed over network 103 to PCSM server 300B, which may establish a communication session between 3P-SP client device 200C and the PCSM server. PCSM server 300B may then look up the first PDCA to find the KDCA paired to it, i.e. the customer KDCA, and attempt to establish a communication session with 3P customer client device 200A. If a communication session between PCSM server 300B and 3P customer client device 200A is established, the PCSM server may then act as an intermediary for pseudonymous communications between 3P customer client device 200A and the 3P-SP client device 200C.

After the primary service period of the customer KDCA-first PDCA pairing and/or the service provider KDCA-second PDCA pairing expires, PCSM system may update both pairings with a secondary KDCA, which may, for example, be associated with 3P-SP call center server 108B. During the secondary service period, data communications directed to either the first or second PDCA may be directed to 3P-SP call center server 108B.

The embodiment described above relates to enabling, establishing, and managing one-to-one pseudonymous communication sessions. Other embodiments may relate to enabling, establishing, and managing one-to-many, or few-to-many, pseudonymous communication systems.

For example, in accordance with a second embodiment, a PCSM system may provide sets of pseudonymous data communication addresses (PDCAs), such as telephone numbers, email domains, or the like, e.g. via a server such as PCSM front-end sever 300A and/or PCSM server 300B, upon request from a third-party service provider server, such as 3P-SP server 108A. For example, 3P-SP server 108A may provide a bulk pseudonymous communication session (PCS) request to PCSM server 300B. In at least one embodiment, a bulk PCS request may include:

- a central data communication address, e.g. associated with 3P-SP call center server 108B;
- a number of desired PDCAs;
- a preferred type of PCA (e.g. telephone number, email domain, etc.)

PCSM server 300B may assign select a set of PDCAs associated with PCSM server 300B from a pool of available PDCAs and allocate the selected set of PDCAs to the batch PCS request. PCSM server 300B may then provide a PCS-request response to 3P-SP sever 108A including the set of PDCAs.

3P-SP server 108A may then associate one or more PDCAs from the set of PDCAs with a potential communicator data record (e.g. a data record associated with an existing or potential customer). For example, 3P-SP server 108A may associate first and second PDCAs from the set of PDCAs with first and second customer accounts respectively, include the first PDCA as part of a customer communication directed to a known data communication address ("KDCA") associated with the first client account, and include the second PDCA as part of a customer communication directed to a KDCA associated with the second client account.

If the operator of customer client device 200A initiates data communication directed to the first PDCA, the data communication may be routed to PCSM server 300B. PCSM server 300B may then provide a data communication request to the central data communication address provided in the bulk PCS request, e.g 3P call center server 108B. PCSM server 300B may communicate to the central data communication address that a service related communication is incoming, directed to the first PDCA. 3P-SP call-center server 108B may then determine which customer account is associated with the first PDCA and obtain any relevant records, e.g. from 3P-SP server 108A, and then route the data communication request to a particular data communication address, such as a data communication address associated with a customer service representative who is familiar with content of the customer communication previously provided to the KDCA associated with the first client account. PCSM server 300B may then act as an intermediary for a pseudonymous communication session between customer client device 200A and 3P-SP call-center server 108B.

Similarly, if the operator of customer client device 200B initiates data communication directed to the second PDCA, the data communication may be routed to PCSM server 300B. PCSM server 300B may then provide a data communication request with 3P-SP call-center server 108B via the central data communication address. PCSM server 300B may communicate to 3P-SP call-center server 108B that that a service related communication is incoming directed to the second PDCA. 3P-SP call-center server 108B may then, for example, obtain customer records associated with second client account and then route the data communication request to a particular data communication address associated with 3P-SP call-center server. PCSM server 300B may then act as an intermediary for a pseudonymous communication session between customer client device 200B and 3P-SP call-center server 108B.

First Exemplary Series of Communications

Figure 4A:
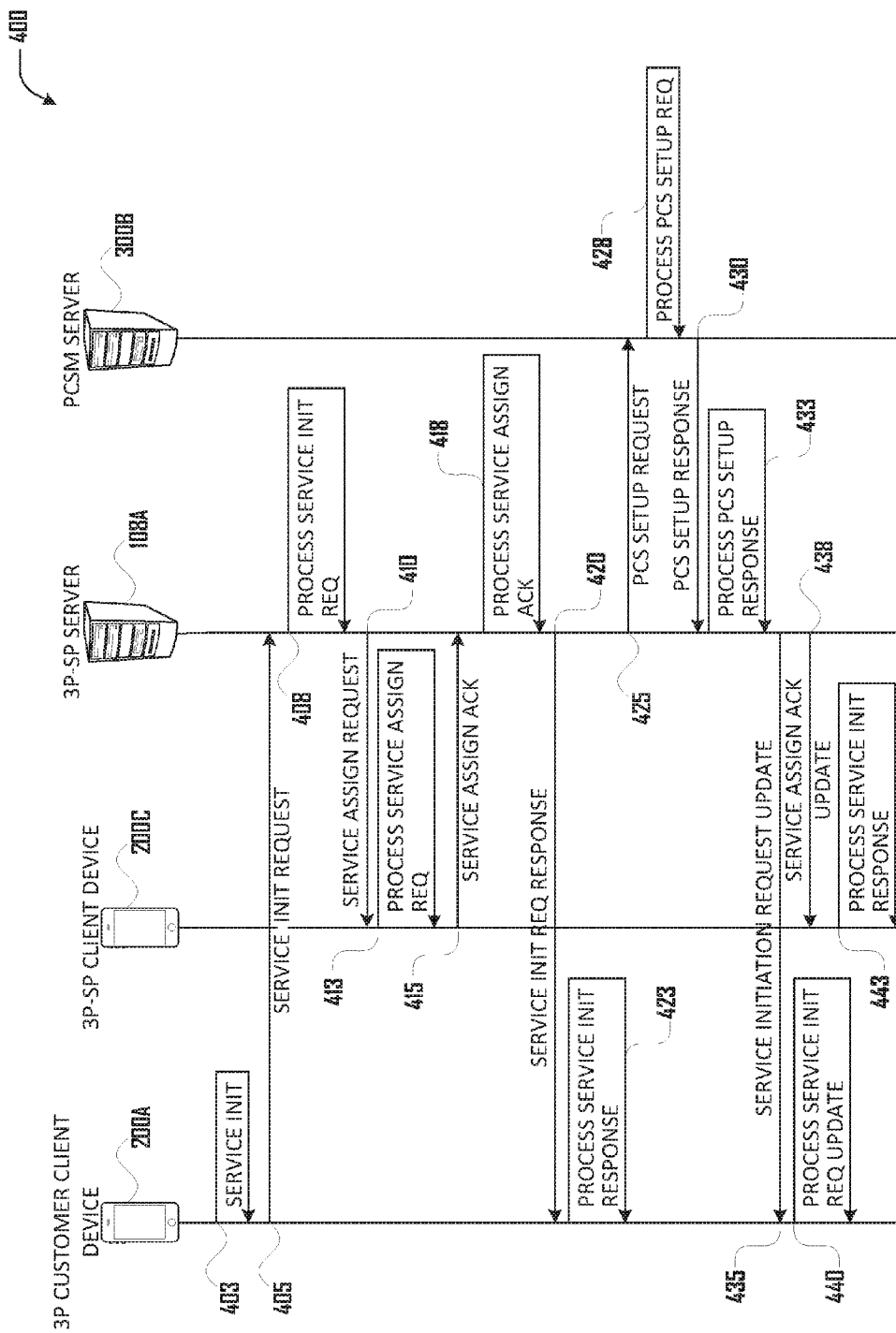
Figure 4B:
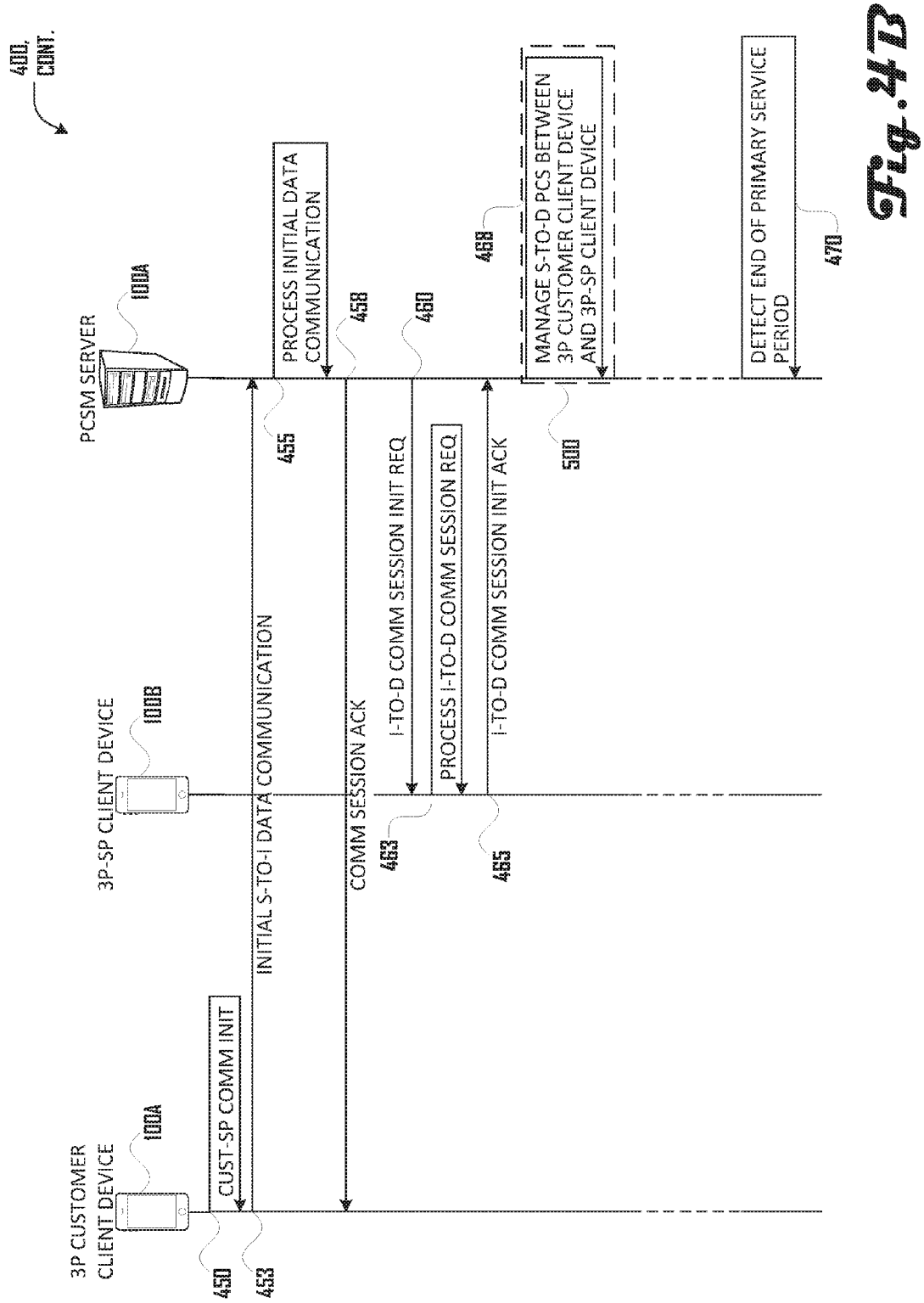

FIGS. 4A-C illustrate a first exemplary series of communications 400 between 3P customer client device 200A, 3P-SP client device 200C, 3P-SP server 108A, and PCSM server 300B in accordance with various embodiments of a PCSM system, such as the PCSM systems described above, and relating to enabling, establishing, and managing on-demand one-to-one pseudonymous communication sessions.

Referring to FIG. 4A, third-party customer client device 200A may process 403 a service initiation request. The service initiation request may be initiated upon obtaining a pre-defined indication from a user of 3P customer client device 200A, e.g. via user input 213.

Third-party customer client device 200A may responsively provide a service initiation request 405 to third-party service provider server 108A.

Third-party service provider server 108A may process 408 service initiation request 405, for example by selecting one or more potential third-party service providers to fulfill service initiation request 405.

Third-party service provider server 108A may provide a service assignment request 410 to a third-party service provider client device, such as third-party service provider client device 200C.

Third-party service provider client device 200C may process 413 service assignment request 410. For example, third-party service provider client device 200C may cause information relating to service initiation request 405 to be rendered via display 215.

If third-party service provider client device 200C obtains an indication that a user of the third-party service provider client device wishes to accept the service assignment request, e.g. via user input 213, third-party service provider client device 200C may provide a service assignment acknowledgment 415 to third-party service provider server 108A responsive to service assignment request 410.

Third-party service provider server 108A may process 418 service assignment acknowledgment 415. For example, third-party service provider server 108A may provide a service initiation request response 420 to third-party customer client device 200A. Third-party customer client device 200A may process 423 service initiation request response 420.

In accordance with various aspects of the present methods and systems, third-party service provider server 108A may also seek to establish a pseudonymous communications session between third-party customer client device 200A and third-party service provider client device 200C.

Third-party service provider server 108A may provide a PCS set-up request 425 to PCSM server 300B. In some embodiments, PCS set-up request 425 may be passed through PCSM front-end server 300A (not shown). The PCS set-up request may include known data communication addresses ("KDCAs") associated with 3P customer client device 200A and 3P-SP client device 200C.

PCSM server 300B may process 428 PCS set-up request 425, for example as is described below in reference to FIG. 7.

PCSM server 300A may provide a PCS set-up response 430 to third-party service provider server 108A. PCS set-up response 430 may include a pseudonymous data communication address ("PDCA") assigned by PCSM server 300B to the third-party customer and a PDCA assigned by PCSM server 300B to the third-party service provider (external to PCSM server 300B, both PDCA's are associated with the PCSM service).

Third-party service provider server 108A may process 433 PCS set up response 430 and begin the primary service period for the service request by providing:

(1) a service initiation request update response 435 to third-party customer client device 200A, including the PDCA assigned to the third-party service provider and (2) a service assignment acknowledgment update 438 to third-party service provider client device 200C, including the PDCA assigned to the third-party customer.

Third-party customer client device 200A may process 440 service initiation request update response 435, for example by providing a user prompt for selectively initiating a pseudonymous communication session with third-party service provider client device 200C, described below in reference to FIG. 5.

Third-party customer client device 200C may similarly process 443 service assignment acknowledgement update 438, for example by providing a user prompt for selectively initiating pseudonymous communication with third-party customer client device 200A Referring now to FIG. 4B, third-party customer client device 200A may process 450 a request to initiate a customer-to-service provider pseudonymous communication session, e.g. obtained via user input 213.

Third-party customer client device 200A may initiate source-to-intermediate ("S-to-I") data communication 453 with the PDCA provided in service initiation request update 435, e.g. if the PDCA is a telephone number, by dialing the telephone number. This may open an ongoing two-way, source-to-intermediate communication session between third-party customer client device 200A and PCSM server 300B.

PCSM server 300B may process 455 initial S-to-I data communication 505 and, e.g. provide a communication session acknowledgement 458 to 3P customer client device 200A and provide an initial intermediate-to-destination ("I-to-D") communication session request 460 to the KDCA assigned to the previously provided PDCA during the primary service period, i.e. the KDCA associated with 3P-SP client device 200C. Continuing the above example, PCSM server 300B may dial the telephone number previously provided in service assignment acknowledgement update 438.

3P-SP client device 200C may process 463 D-to-I communication request 460 and provide a responsive I-to-D communication session acknowledgement 465. This may open an ongoing two-way, intermediate-to-destination communication session between PCSM server 300B and third-party service provider client device 200C.

PCSM server 300B may then bridge 468 the S-to-I communication channel and the I-to-D communication channel, creating an ongoing source-to-destination ("S-to-D") pseudonymous communication session 500 between 3P customer client device 200A and 3P-SP client device 200C, for example as is described below in reference to FIG. 5.

PCSM server 300B may detect 470 the expiration of the primary service period associated with the PCS setup request.

Referring now to FIG. 4C, third-party customer client device 200A may process 471 a request to initiate a customer-to-service provider pseudonymous communication session, e.g. obtained via user input 213.

Third-party customer client device 200A may initiate source-to-intermediate ("S-to-I") data communication 472 with the PDCA provided in service initiation request update 435. This may open an ongoing two-way, source-to-intermediate communication session between third-party customer client device 200A and PCSM server 300B.

PCSM server 300B may process 473 initial S-to-I data communication 472, provide a communication session acknowledgement 474 to 3P customer client device 200A and provide an initial intermediate-to-destination ("I-to-D") communication session request 475 to the KDCA assigned to the previously provided PDCA during the secondary service period, i.e. the KDCA associated with 3P-SP call center server 108B.

3P-SP client device 200C may process 476 D-to-I communication request 475 and provide a responsive I-to-D communication session acknowledgement 477. This may open an ongoing two-way, intermediate-to-destination communication session between PCSM server 300B and 3P-SP call center server 108B.

PCSM server 300B may then bridge 478 the S-to-I communication channel and the I-to-D communication channel, creating an ongoing source-to-destination ("S-to-D") pseudonymous communication session between 3P customer client device 200A and 3P-SP client device 200C.

Third-party service provider client device 200C may process 480 a request to initiate a customer-to-service provider pseudonymous communication session, e.g. obtained via user input 213.

Third-party service provider client device 200C may initiate source-to-intermediate ("S-to-I") data communication 481 with the PDCA provided in service assignment acknowledgement update 438. This may open an ongoing two-way, source-to-intermediate communication session between 3P-SP client device 200C and PCSM server 300B.

PCSM server 300B may process 482 initial S-to-I data communication 481, provide a communication session acknowledgement 483 to 3P-SP client device 200C and provide an initial intermediate-to-destination ("I-to-D") communication session request 484 to the KDCA assigned to the previously provided PDCA during the secondary service period, i.e. the KDCA associated with 3P-SP call center server 108B.

3P-SP client device 200C may process 485 D-to-I communication request 484 and provide a responsive I-to-D communication session acknowledgement 477. This may open an ongoing two-way, intermediate-to-destination communication session between PCSM server 300B and 3P-SP call center server 108B.

PCSM server 300B may then bridge 478 the S-to-I communication channel and the I-to-D communication channel, creating an ongoing source-to-destination ("S-to-D") pseudonymous communication session between 3P customer client device 200A and 3P-SP client device 200C.

Second Exemplary Series of Communications

Figure 5:
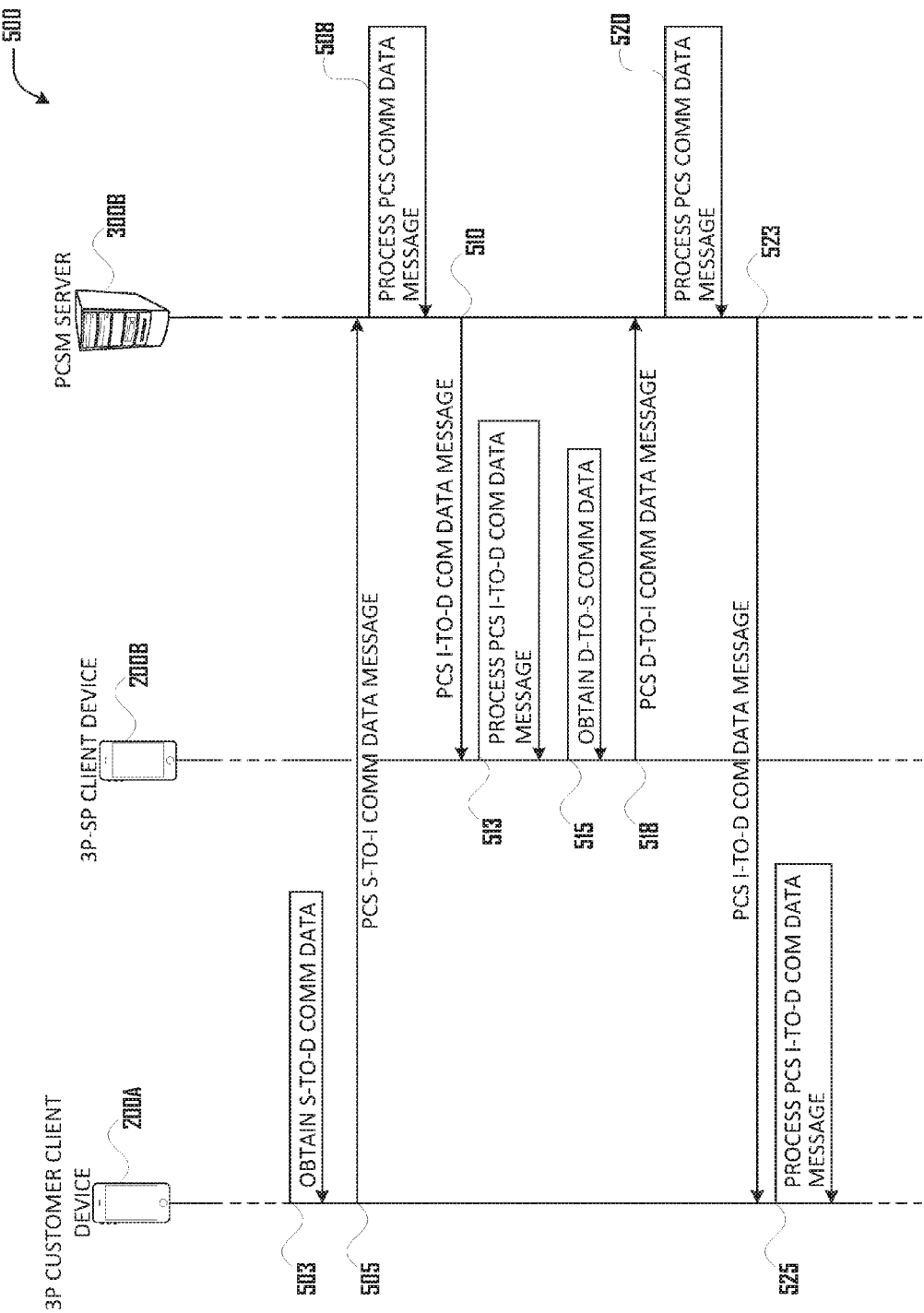
FIG. 5 illustrates a second exemplary series of communications between various devices shown in FIG. 1, including a PCSM server in accordance with various embodiments.

FIG. 5 illustrates a second exemplary series of communications 500 between 3P customer client device 200A, 3P-SP client device 200C, and PCSM server 300B during a pseudonymous communication session in accordance with various embodiments of a PCSM system, such as the PCSM system illustrated in FIG. 1. In the example shown in FIG. 5, data communication is initiated by 3P customer client device 200A; however, the series of communications would be similar if data communication was initiated by 3P-SP client device 200C, or any other client device.

3P customer client device 200A may obtain 503 source-to-destination ("S-to-D") communication data, e.g. via user input 213.

3P customer client device 200A may provide a PCS source-to-intermediate ("S-to-I") communication data message 505, including the S-to-D communication data, to PCSM server 300B.

PCSM server 300B may process 508 PCS S-to-I communication data message 505 and provide a corresponding PCS intermediate-to-destination ("I-to-D") communication data message 510, including the S-to-D communication data, to 3P-SP client device 200C.

3P-SP client device 200C may process 513 PCS I-to-D communication data message 510.

3P-SP client device 200C may obtain 515 destination-to-source ("D-to-S") communication data, e.g. via user input 213.

3P-SP client device 200C may provide a PCS destination-to-intermediate ("D-to-I") communication data message 518, including the D-to-S communication data, to PCSM server 300B.

PCSM server 300B may process 520 PCS D-to-I communication data message 518 and provide a corresponding PCS intermediate-to-source ("I-to-S") communication data message 523, including the D-to-S communication data, to 3P customer client device 200A.

3P customer client device 200A may process 525 PCS I-to-S communication data message 523.

The above communications may repeat on demand upon either client device obtaining communication data intended to be provided to the other client device via the pseudonymous communication session.

Third Exemplary Series of Communications

Figure 6:
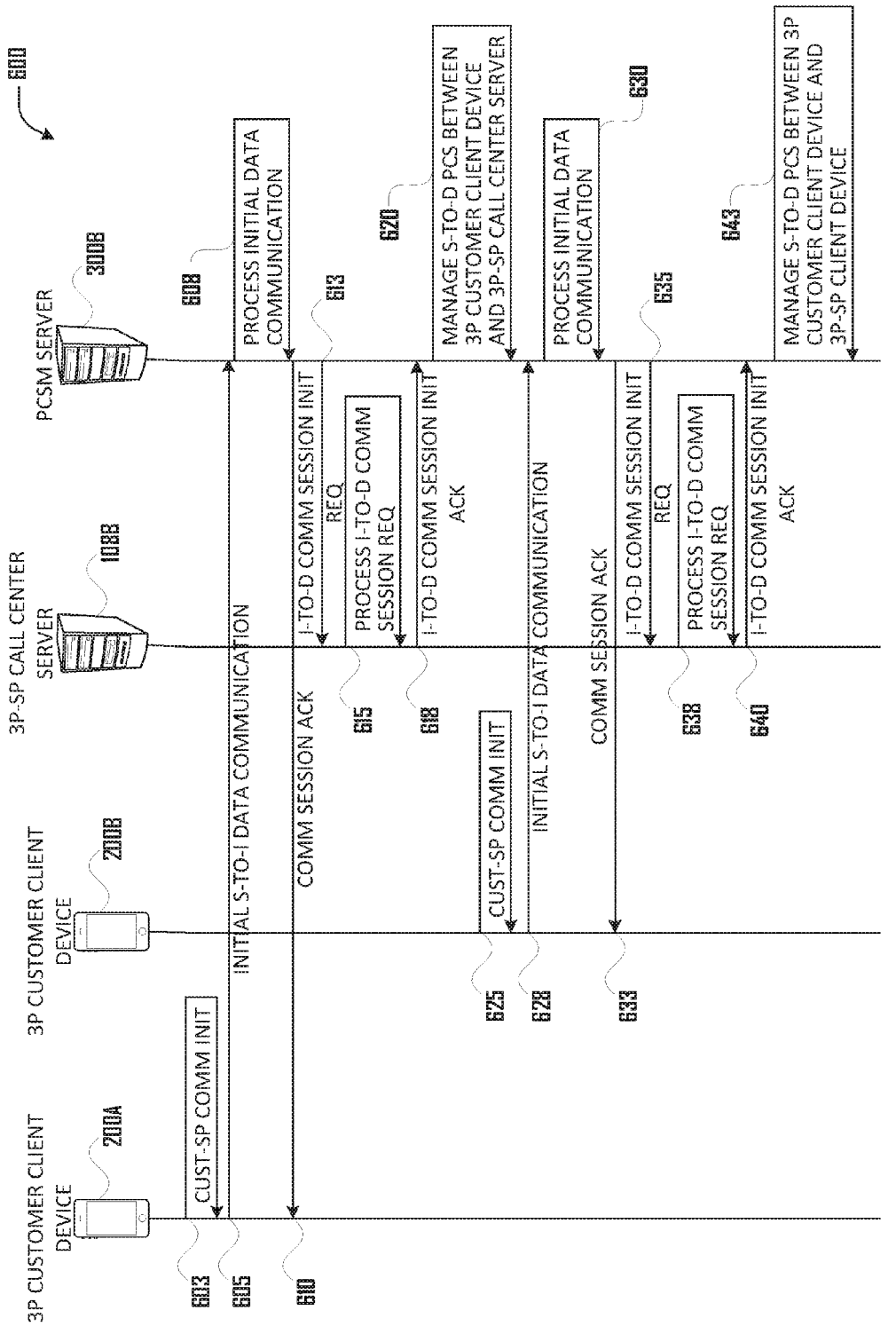
FIG. 6 illustrates a third exemplary series of communications between various devices shown in FIG. 1, including a PCSM server in accordance with various embodiments.

FIG. 6 illustrates a third exemplary series of communications 600 between 3P customer client device 200A, 3P customer client device 200B, 3P-SP call center server 108B, and PCSM server 300B in accordance with various embodiments of a PCSM system, for example during a secondary service period, as described above.

First 3P customer client device 200A may process 603 a customer-to-service provider communication initiation request.

First 3P customer client device 200A may provide an initial, source-to-intermediate, data communication 605 to a first PDCA associated with PCSM server 300B.

PCSM server 300B may process 608 data communication 605, e.g. by looking up a KDCA paired to the first PDCA, providing a communication session acknowledgement 610 to 3P customer client device 200A, and providing an intermediate-to-destination communication session initiation request 613 to the paired KDCA. In the current example, the first PDCA is paired to a secondary KDCA associated with 3P-SP call center server 108B.

3P-SP call center server 108B may process 615 intermediate-to-destination communication session initiation request 613, e.g. by providing an intermediate-to-destination communication session initiation acknowledgement 618 to PCSM server 300B.

PCSM server may then manage 620 a source-to-destination pseudonymous communication session ("PCS") between first customer client device 200A and 3P-SP call center server 108B.

During the management 620 of the source-to-destination pseudonymous communication session ("PCS") between first customer client device 200A and 3P-SP call center server 108B, second 3P customer client device 200B may process 625 a customer-to-service provider communication initiation request.

Second 3P customer client device 200B may provide an initial, source-to-intermediate, data communication 6328 to a second PDCA associated with PCSM server 300B.

PCSM server 300B may process 630 data communication 628, e.g. by looking up a KDCA paired to the second PDCA, providing a communication session acknowledgement 633 to 3P customer client device 200A, and providing an intermediate-to-destination communication session initiation request 635 to the paired KDCA. In the current example, the second PDCA is also paired to the secondary KDCA associated with 3P-SP call center server 108B.

3P-SP call center server 108B may process 638 intermediate-to-destination communication session initiation request 635, e.g. by providing an intermediate-to-destination communication session initiation acknowledgement 640 to PCSM server 300B.

PCSM server may then manage 643 a source-to-destination pseudonymous communication session ("PCS") between second customer client device 200B and 3P-SP call center server 108B.

Exemplary PCS Initiation Routine

Figure 7:
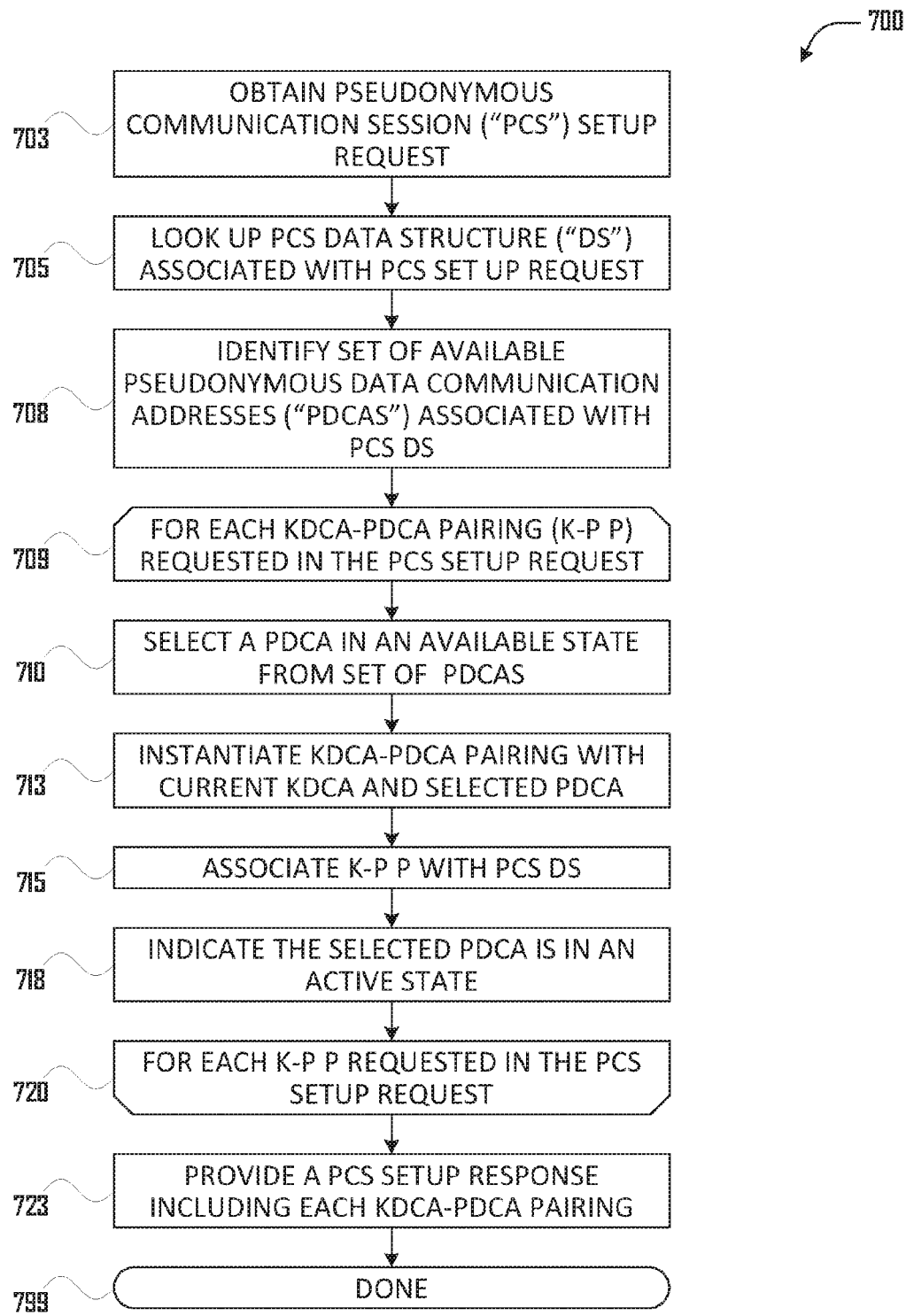
FIG. 7 illustrates a control flow diagram corresponding to an exemplary PCS initiation routine in accordance with various embodiments.

FIG. 7 illustrates an exemplary PCS setup routine 700 in accordance with various aspects of the present methods and systems. PCS setup routine 700 may, for example, be implemented by PCSM service 323B operating on PCSM server 300B.

PCS setup routine 700 may obtain a pseudonymous communication session ("PCS") set up request at execution block 703. The PCS set up request may request at least one pairing between a known data communication addresses ("KDCA") and a pseudonymous data communication address ("PDCA").

PCS setup routine 700 may look up a PCS data structure ("DS") associated with the PCS set up request at execution block 705.

PCS setup routine 700 may identify a set of available PDCAs associated with the PCS data structure at execution block 708.

At starting block 709, may process each KDCA obtained in the PCS set up request in turn.

PCS setup routine 700 may select a pseudonymous data communication address from the set of available pseudonymous data communication addresses associated with the PCS data structure at execution block 710.

PCS setup routine 700 may instantiate a KDCA-PDCA pair using the current KDCA in the selected PDCA at execution block 713.

PCS setup routine 700 may associate the KDCA-PDCA pair with the PCS data structure at execution block 715.

PCS setup routine 700 may indicate PDCA is an available state at execution block 718.

At ending loop block 720, PCS setup routine 700 may loop hack to starting block 7092 process the next KDCA obtained in the PCS set up request, if any.

PCS setup routine 700 may provide a PCS set up response including each KDCA-PDCA pairing at execution block 723.

PCS setup routine 700 may end at termination block 799.

PCS Initiation Routine

Figure 8:
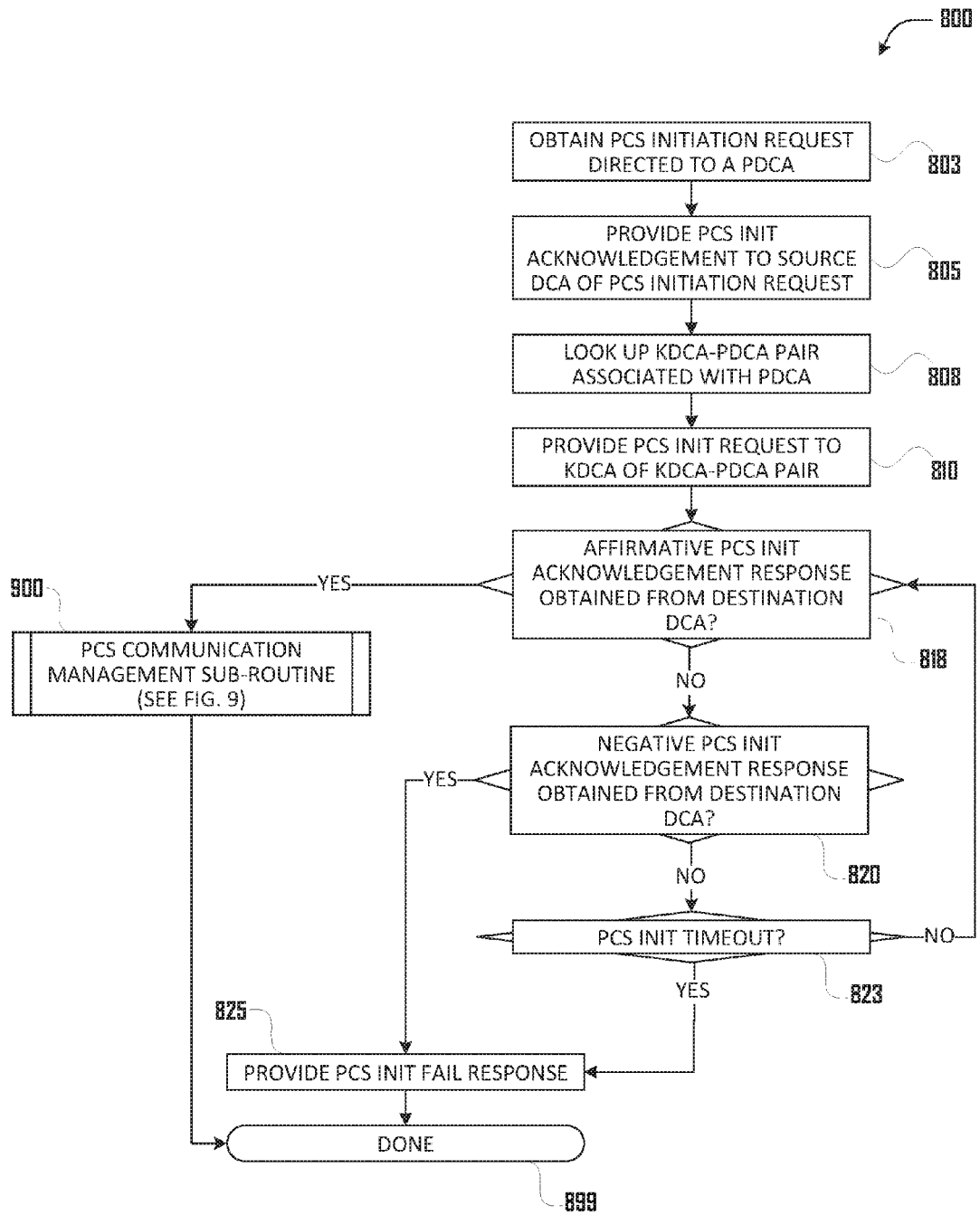
FIG. 8 illustrates a control flow diagram corresponding to an exemplary PCS management routine in accordance with various embodiments.

FIG. 8 illustrates an exemplary PCS initiation routine 800. PCS initiation routine 800 may represent a portion of the functionality of a PCSM service being executed by central processing unit 303 of PCSM server 300B in cooperation with various other hardware and software components of the PCSM server.

Routine 800 may obtain a PCS initiation request directed to a PDCA at execution block 803.

PCS initiation routine 800 may provide a PCS initiation acknowledgment to the source data communication address of the PCS initiation request at execution block 805.

PCS initiation routine 800 may look up a KDCA-PDCA pair associated with the obtained PDCA at execution block 808.

PCS initiation routine 800 may provide a PCS initiation request to the KDCA of the KDCA-PDCA pair (the "destination DCA") at execution block 810.

At decision block 818, if an affirmative PCS initiation acknowledgment response is obtained from the destination DCA, then PCS initiation routine 800 may call PCS communication management sub-routine 900, described below with reference to FIG. 9 before proceeding to termination block 899; otherwise PCS initiation routine 800 may proceed to decision block 820.

At decision block 820, if a negative PCS initiation acknowledgment response is obtained from the destination DCA, then PCS initiation routine 800 may proceed to execution block 825; otherwise, PCS initiation routine 800 may proceed to decision block 823.

At decision block 823, if a PCS initiation timeout occurs, for example because neither an affirmative nor a negative PCS initiation acknowledgment response is obtained within a predetermined time interval, then PCS initiation routine 800 may proceed to execution block 825; otherwise PCS initiation routine 800 may loop back decision block 818.

PCS initiation routine 800 may provide a PCS initiation failure response to the source DCA at execution block 825.

PCS initiation routine 800 may terminate at execution block 899.

PCS Communication Management Sub-Routine

Figure 9:
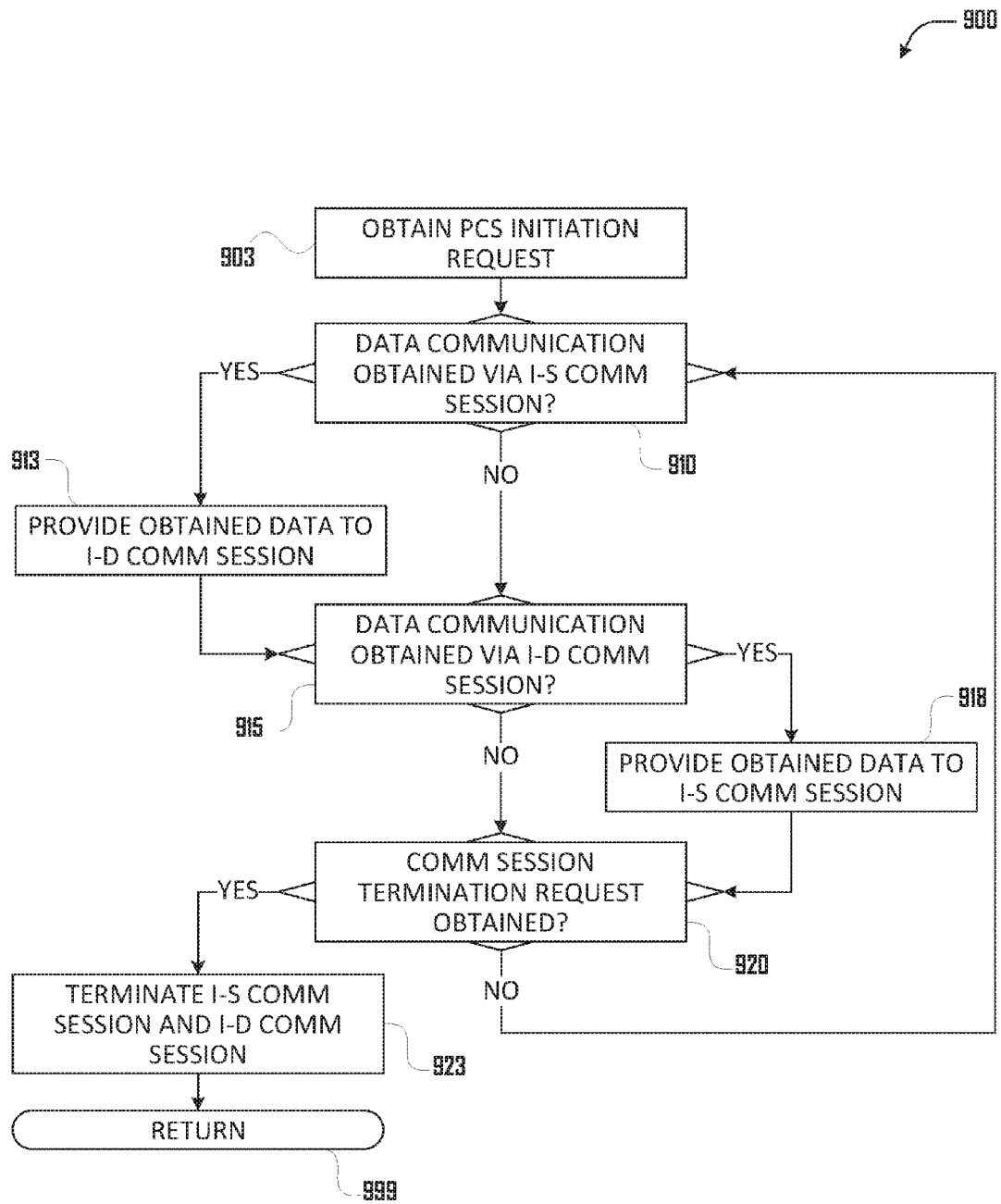
FIG. 9 illustrates a control flow diagram corresponding to an exemplary PCS communication session management sub-routine in accordance with various embodiments.

FIG. 9 illustrates an exemplary PCS communication management sub-routine 900. PCS communication management sub-routine 900 may represent a portion of the functionality of a PCSM service being executed by central processing unit 303 of PCSM server 300B in cooperation with various other hardware and software components of the PCSM server.

PCS communication management sub-routine 900 may obtain a PCS management request at execution block 903.

PCS communication management sub-routine 900 may establish an intermediate-to-source communication session between the PCSM service and the source data communication address and an intermediate-to-destination communication session between the PCSM service and the destination data communication address at execution block 905.

At decision block 910, if data communication is obtained by the PCSM service via the intermediate-to-source communication session, then PCS communication management sub-routine 900 may proceed to execution block 913; otherwise, PCS communication management sub-routine 900 may proceed to decision block 915.

PCS communication management sub-routine 900 may provide the obtained communication data to the destination data communication address via the intermediate-to-destination communication session at execution block 913.

At decision block 915, if data communication is obtained by the PCSM service by the intermediate-to-destination communication session, then PCS communication management sub-routine 900 may proceed to execution block 918; otherwise PCS communication management sub-routine 900 may proceed to termination block 920.

PCS communication management sub-routine 900 may provide the obtained communication data to the source data indication addressed by the intermediate-to-source communication session at execution block 918.

At decision block 920, if a communication session termination request is obtained from either the source data communication address or the destination data communication address, then PCS communication management sub-routine 900 may proceed to execution block 923; otherwise, PCS communication management sub-routine 900 may loop back to decision block 910.

PCS communication management sub-routine 900 may end at termination block 999.

PDCA Maintenance Routine

Figure 10:
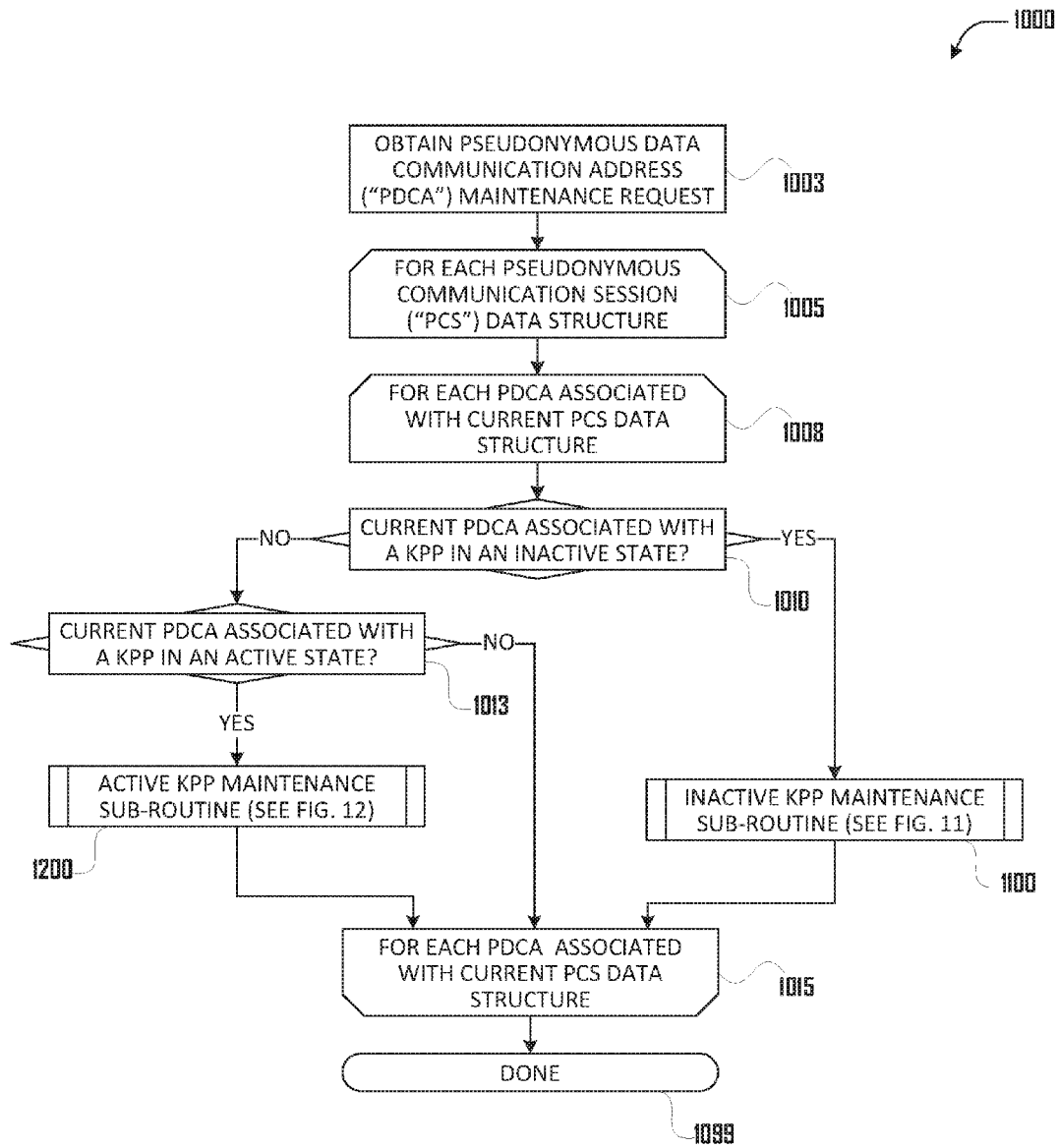
FIG. 10 illustrates a control flow diagram corresponding to an exemplary pseudonymous data communication address maintenance routine in accordance with various embodiments.

FIG. 10 illustrates an exemplary PDCA maintenance routine. PDCA maintenance routine may represent a portion of the functionality of a PCSM service being executed by central processing unit 303 of PCSM server 300B in cooperation with various other hardware and software components of the PCSM server.

PDCA maintenance routine may obtain a pseudonymous data communication address maintenance request at execution block 1003. The pseudonymous data communication address maintenance request may include one or more PCS data structure identifiers.

At starting loop block 1005, PDCA maintenance routine may process each PCS data structure identifier in turn.

At starting loop block 1008, PDCA maintenance routine may process each PDCA associated with the current PCS data structure in turn.

At decision block 1010, if the current PDCA is associated with a KDCA-PDCA pair that is in an inactive state, then PDCA maintenance routine may call inactive KPP maintenance sub-routine 1100, described below with reference to FIG. 11, before proceeding to ending loop block 1015; otherwise, PDCA maintenance routine may proceed to decision block 1013.

At decision block 1013, if the current PDCA is associated with a PDCA-PDCA pair that is in an active state, then PDCA maintenance routine may call active KPP maintenance sub-routine 1200, described below with reference to FIG. 12, before proceeding to ending loop block 1015; otherwise, PDCA maintenance routine may proceed directly to ending loop block 1015.

At ending loop block 1015, PDCA maintenance routine may loop back to starting loop block 1008 and process the next PDCA associated with the current PCS data structure, if any.

At ending loop block 1018, PDCA maintenance routine may loop back to starting block 1005 and process the next PCS data structure identifier, if any.

PDCA maintenance routine may end up termination block 1099.

Inactive KPP Maintenance Sub-Routine

Figure 11:
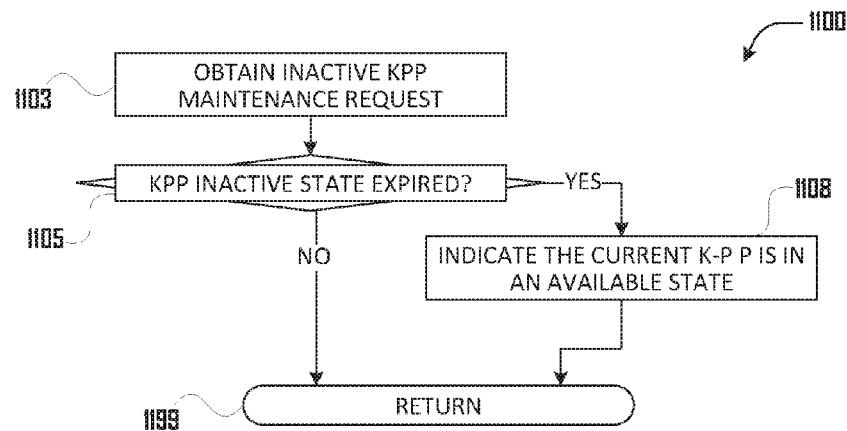
FIG. 11 illustrates a control flow diagram corresponding to an exemplary inactive KDCA-PDCA pairing ("KPP") maintenance sub-routine in accordance with various embodiments.

FIG. 11 illustrates an exemplary inactive KPP maintenance sub-routine 1100. Inactive KPP maintenance sub-routine 1100 may represent a portion of the functionality of a PCSM service being executed by central processing unit 303 of PCSM server 300B in cooperation with various other hardware and software components of the PCSM server.

Inactive KPP maintenance sub-routine 1100 may obtain an inactive KDCA-PDCA pair maintenance request at execution block 1103. The inactive KDCA-PDCA pair maintenance request may include a KDCA-PDCA pair identifier.

At decision block 1105, if the inactive state of the KDCA-PDCA pair has expired, then inactive KPP maintenance sub-routine 1100 may proceed to execution block 1108; otherwise inactive KPP maintenance sub-routine 1100 may proceed to termination block 1199.

Inactive KPP maintenance sub-routine 1100 may indicate the KDCA-PDCA pair is now in an available state at execution block 1108.

Inactive KPP maintenance sub-routine 1100 may end at termination block 1199.

Active KPP Maintenance Sub-Routine

Figure 12:
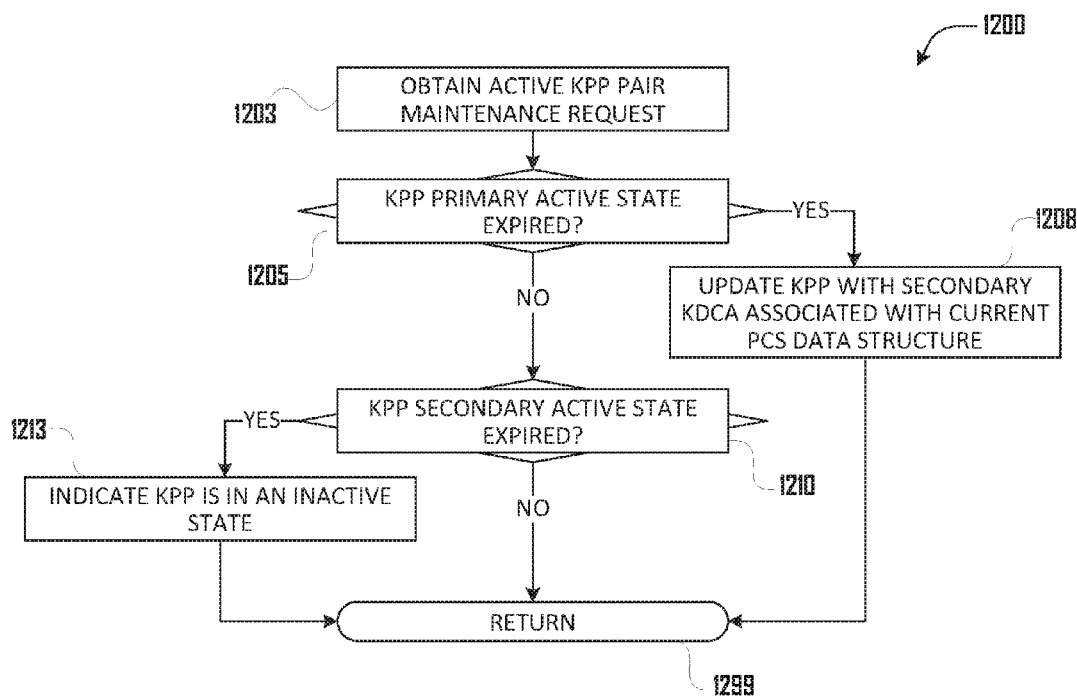
FIG. 12 illustrates a control flow diagram corresponding to an exemplary active KDCA-PDCA pairing ("KPP") maintenance sub-routine in accordance with various embodiments.

FIG. 12 illustrates an exemplary active KPP maintenance sub-routine 1200. Active KPP maintenance sub-routine 1200 may represent a portion of the functionality of a PCSM service being executed by central processing unit 303 of PCSM server 300B in cooperation with various other hardware and software components of the PCSM server.

The KDCA-PDCA pair maintenance request may include a KDCA-PDCA pair identifier.

At decision block 105, if the primary active state of the KDCA-PDCA pair has expired, then active KPP maintenance sub-routine 1200 may proceed to execution block 1208; otherwise active KPP maintenance sub-routine 1200 may proceed to decision block 1210.

Active KPP maintenance sub-routine 1200 may update the KDCA-PDCA pair with a secondary KDCA associated with the current PCS data structure at execution block 1208.

At decision block 1210, if the secondary active state of the KDCA-PDCA pair has expired, then active KPP maintenance sub-routine 1200 may proceed to execution block 1213; otherwise routine 1200 may proceed to termination block 1299.

Active KPP maintenance sub-routine 1200 may indicate the KDCA-PDCA pair is now in an inactive state at execution block 1213.

Active KPP maintenance sub-routine 1200 may and at termination block 1299.

CONCLUSION

Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein.

We claim:

1. A pseudonymous communication session (PCS) management system, the system comprising:
a data store, said data store including data records corresponding to a plurality of data communication addresses in an available state and including a first data communication address;
a computer processing unit in data communication with said data store; and
memory in data communication with said computer processing unit and including instructions for causing said processing unit to execute a method, the method including:
(a) obtaining a PCS set up request, said PCS set up request being associated with a PCS data structure and including a second data communication address;
(b) selecting said first data communication address;
(c) pairing said first data communication address to said second data communication address in said PCS data structure associated with said PCS set up request;
(d) indicating said first data communication address is now in an active state; and
(e) providing said first data communication address in a response to said PCS set up request, wherein the method further includes obtaining an incoming communication signal directed to said first data communication address, said incoming communication signal originating from a third data communication address and providing an outgoing communication signal directed to said second data communication address and establishing a pseudonymous communication session between said second data communication address and said third data communication address and wherein establishing a pseudonymous communication session between said third data communication address and said second data communication address includes establishing an ongoing communication session between said third data communication address and said first data communication address and establishing an ongoing communication session between said first data communication address and said second data communication address.

2. The pseudonymous communication session management system of claim 1, wherein said response to said PCS set up request includes a pair value including a representation of said first data communication address and said second data communication address.

3. The pseudonymous communication session management system of claim 2, wherein said pair value includes a representation of a client entity identifier associated with said PCS set up request.

4. A pseudonymous communication session (PCS) management system, the system comprising:
- a data store, said data store including data records corresponding to a plurality of data communication addresses in an available state and including a first data communication address;
- a computer processing unit in data communication with said data store; and
- memory in data communication with said computer processing unit and including instructions for causing said processing unit to execute a method, the method including:
  - (a) obtaining a PCS set up request, said PCS set up request being associated with a PCS data structure and including a second data communication address;
  - (b) selecting said first data communication address;
  - (c) pairing said first data communication address to said second data communication address in said PCS data structure associated with said PCS set up request;
  - (d) indicating said first data communication address is now in an active state; and
  - (e) providing said first data communication address in a response to said PCS set up request, wherein a primary service period duration value and a fifth data communication address are associated with said PCS data structure and the method further includes:
  - (f) determining an elapsed duration between a current time and a time of pairing said first and second data communication addresses exceeds said primary service period duration value; and
  - (g) pairing said first data communication address to said fifth data communication address in said PCS data structure.

5. The pseudonymous communication session management system of claim 4, wherein the method further includes:
- obtaining an incoming communication signal directed to said first data communication address, said incoming communication signal originating from a third data communication address;
- providing an outgoing communication signal directed to said fifth data communication address; and
- establishing a pseudonymous communication session between said fifth data communication address and said third data communication address.

6. The pseudonymous communication session management system of claim 4, wherein said response to said PCS set up request includes a pair value including a representation of said first data communication address and said second data communication address.

7. A pseudonymous communication session (PCS) management system, the system comprising:
- a data store, said data store including data records corresponding to a plurality of data communication addresses in an available state and including a first data communication address;
- a computer processing unit in data communication with said data store; and
- memory in data communication with said computer processing unit and including instructions for causing said processing unit to execute a method, the method including:
  - (a) obtaining a PCS set up request, said PCS set up request being associated with a PCS data structure and including a second data communication address;
  - (b) selecting said first data communication address;
  - (c) pairing said first data communication address to said second data communication address in said PCS data structure associated with said PCS set up request;
  - (d) indicating said first data communication address is now in an active state; and
  - (e) providing said first data communication address in a response to said PCS set up request, wherein an active state period duration value is associated with said PCS data structure and the method further includes:
  - (f) determining an elapsed duration between a current time and a time of step (c) occurring exceeds said active state period duration value; and
  - (g) indicating said first data communication address is now in an inactive state.

8. The pseudonymous communication session management system of claim 7, wherein an inactive state period duration value is associated with said PCS data structure and the method further includes:
  - (h) determining an elapsed duration between a current time and a time of step (i) occurring exceeds said inactive state period duration value; and
  - (i) indicating said first data communication address is again in said available state.

9. The pseudonymous communication session management system of claim 7, wherein said response to said PCS set up request includes a pair value including a representation of said first data communication address and said second data communication address.

10. A pseudonymous communication session (PCS) management system, the system comprising:
- a data store, said data store including data records corresponding to a plurality of data communication addresses in an available state and including a first data communication address;
- a computer processing unit in data communication with said data store; and
- memory in data communication with said computer processing unit and including instructions for causing said processing unit to execute a method, the method including:
  - (a) obtaining a PCS set up request, said PCS set up request being associated with a PCS data structure and including a second data communication address;
  - (b) selecting said first data communication address;
  - (c) pairing said first data communication address to said second data communication address in said PCS data structure associated with said PCS set up request;
  - (d) indicating said first data communication address is now in an active state; and
  - (e) providing said first data communication address in a response to said PCS set up request, wherein:
  - said plurality of data communication addresses in an available state includes a third data communication address;
  - said PCS set up request includes a fourth data communication address;
  - step (b) further includes selecting said third data communication address;

step (c) further includes pairing said third data communication address to said fourth data communication address in said PCS data structure;

step (d) further includes indicating said third data communication address is now in an active state; and step (e) further includes providing said second data communication address, an indication said second data communication address is paired with said first data communication address, and an indication said fourth data communication address is paired with said third data communication address in response to said pseudonymous communication session initiation request.

11. The pseudonymous communication session management system of claim 10, wherein said response to said PCS set up request includes a pair value including a representation of said first data communication address and said second data communication address.

12. The pseudonymous communication session management system of claim 10, wherein said response to said pseudonymous data communication session set up request includes a first pair value including a representation of said first data communication address and said second data communication address and a second pair value including a representation of said third communication address and said fourth data communication address.

13. The pseudonymous communication session management system of claim 12, wherein said first and second pair values each include a representation of a client entity identifier associated with said PCS set up request.

14. The pseudonymous communication session management system of claim 10, wherein the method further includes:
 a. obtaining a first data communication directed to said first data communication address, said first data communication originating from said fourth data communication address; and
 b. providing a second data communication directed to said second data communication address, said second data communication corresponding to said first data communication.

15. The pseudonymous communication session management system of claim 14, wherein the method further includes:
 a. obtaining an incoming communication signal directed to said first data communication address, said incoming communication signal originating from said fourth data communication address;
 b. providing an outgoing communication signal directed to said second data communication address; and
 c. establishing a pseudonymous communication session between said second data communication address and said fourth data communication address.

16. The pseudonymous communication session management system of claim 15, wherein establishing a pseudonymous communication session between said second data communication address and said fourth data communication address includes establishing a communication session between said second data communication address and said first data communication address and establishing a communication session between said fourth data communication address and said third data communication address.

17. The pseudonymous communication session management system of claim 10, wherein a primary service period duration value and a fifth data communication address are associated with said PCS data structure and the method further includes:
 a. determining an elapsed duration between a current time and a time of pairing said first and third data communication addresses exceeds said primary service period duration value;
 b. pairing said first data communication address and said third data communication address to said fifth data communication address in said PCS data structure.

18. The pseudonymous communication session management system of claim 17, wherein the method further includes:
 (h) obtaining an incoming communication signal directed to said first data communication address, said incoming communication signal originating from a third data communication address;
 (i) providing an outgoing communication signal directed to said fifth data communication address; and
 (j) establishing a pseudonymous communication session between said fifth data communication address and said third data communication address.

19. The pseudonymous communication session management system of claim 10, wherein an active state period duration value is associated with said PCS data structure and the method further includes:
 a. determining an elapsed duration between a current time and a time of step (c) occurring exceeds said active state period duration value; and
 b. indicating said first data communication address is now in an inactive state.

20. The pseudonymous communication session management system of claim 19, wherein an inactive state period duration value is associated with said PCS data structure and the method further includes:
 (h) determining an elapsed duration between a current time and a time of step (i) occurring exceeds said inactive state period duration value; and
 indicating said first data communication address is again in said available state.

* * * * *